US012423403B1

(12) United States Patent
Alonzo, III et al.

(10) Patent No.: US 12,423,403 B1
(45) Date of Patent: Sep. 23, 2025

(54) PREVENTING SPAM COMMUNICATIONS

(71) Applicant: UIPCO, LLC, San Antonio, TX (US)

(72) Inventors: Edward Manuel Alonzo, III, San Antonio, TX (US); Robert Lee Black, San Antonio, TX (US); Sydney Ann Conrad-Cook, Van Meter, IA (US); Madhusudhana Rao Abburi, San Antonio, TX (US); Janelle Denice Dziuk, Falls City, TX (US); Carlos J P Chavez, San Antonio, TX (US)

(73) Assignee: UIPCO, LLC, San Antonio, TX (US)

( * ) Notice: Subject to any disclaimer, the term of this patent is extended or adjusted under 35 U.S.C. 154(b) by 301 days.

(21) Appl. No.: 18/173,436

(22) Filed: Feb. 23, 2023

(51) Int. Cl.
*G06F 21/44* (2013.01)
*H04M 3/42* (2006.01)

(52) U.S. Cl.
CPC ........ *G06F 21/44* (2013.01); *H04M 3/42034* (2013.01); *G06F 2221/2133* (2013.01); *H04M 2203/6072* (2013.01)

(58) Field of Classification Search
CPC ............ G06F 21/44; G06F 2221/2133; H04M 3/42034; H04M 2203/6072
See application file for complete search history.

(56) References Cited

U.S. PATENT DOCUMENTS

| | | | |
|---|---|---|---|
| 9,667,577 B2 | 5/2017 | Deluca et al. | |
| 10,067,772 B1 | 9/2018 | Ledet | |
| 10,594,648 B2 | 3/2020 | Iyer et al. | |
| 2009/0132662 A1 | 5/2009 | Sheridan et al. | |
| 2010/0268682 A1 | 10/2010 | Lewis et al. | |
| 2010/0317319 A1* | 12/2010 | Gorman | H04M 3/42382 455/410 |
| 2011/0191847 A1* | 8/2011 | Davis | H04L 63/1483 709/224 |
| 2018/0176168 A1 | 6/2018 | Tsou | |
| 2019/0020687 A1 | 1/2019 | Noon et al. | |
| 2019/0197479 A1 | 6/2019 | Huang et al. | |
| 2021/0306456 A1* | 9/2021 | Kanagala | H04M 3/4365 |
| 2022/0078197 A1 | 3/2022 | Jakobsson et al. | |
| 2023/0075625 A1* | 3/2023 | Patel | H04M 3/42221 |
| 2023/0334247 A1 | 10/2023 | Albero et al. | |

* cited by examiner

*Primary Examiner* — Nicholas R Taylor
*Assistant Examiner* — Tania M Pena-Santana
(74) *Attorney, Agent, or Firm* — Potomac Law Group, PLLC; Dannon G. Allbee

(57) ABSTRACT

Aspects of the present disclosure are directed to systems and methods for preventing spam communications. Implementations can implement an access control list that a communicator (e.g., a user device sending a text message, making a phone call, etc.) must be on in order to complete the communication with a recipient. If they are not on the access control list, the communicator can be prevented from sending the communication to the recipient, redirected to a registration process, or the communication can be tagged with an unverified status flag. In some implementations, the access control list can include a recipient's contacts, contacts of the recipient's contacts, authenticated entities (e.g., users and/or companies), previously verified entities, etc. In some implementations, a recipient can give out a temporary extension that a communicator can enter to complete communications with the recipient for a certain amount of time or for a certain number of uses.

20 Claims, 8 Drawing Sheets

| Registry | | | |
|---|---|---|---|
| Identifier | Name | | Type |
| (111) 111-1111 | Amanda | | Contact |
| (222) 222-2222 | Kasey | | Contact |
| chase@friend.com | Chase | | Contact of Amanda |
| (444) 444-4444 | Mynor | | Contact of Kasey |
| (555) 555-5555 | Marlene | | Previously Verified |
| info@example.com | Example Corp. | | Previously Verified |
| (777) 777-7777 | GameFun LLC | | Installed Application |
| Extension | # of Uses | Valid Until | Status |
| 1234 | 5 | 10 uses | Valid |
| 2345 | 2 | 5 uses | Valid |
| 3456 | 10 | 2023-01-01 | Valid |
| SARAH | 32 | 2022-10-12 | Expired |
| a19y84 | unlimited | no expiration | Valid |

*FIG. 6*

PREVENTING SPAM COMMUNICATIONS

TECHNICAL FIELD

The present disclosure is directed to systems and methods for preventing spam communications.

BACKGROUND

The rapid growth in communication technology, such as electronic mail ("e-mail") telephones (e.g., cellular phones), has made mass marketing an easy and simple option for many companies. Consequently, unsolicited e-mails, phone calls, and text messages with widespread advertising broadcasts have become commonplace. Such unsolicited communications are often referred to as "spam." Although many mechanisms have been developed to block spam, they have been largely ineffective at identifying potentially unwanted communications, while still allowing valid communications to persist.

BRIEF DESCRIPTION OF THE DRAWINGS

FIG. 6 is a conceptual diagram illustrating an example registry according to some implementations.

The techniques introduced here may be better understood by referring to the following Detailed Description in conjunction with the accompanying drawings, in which like reference numerals indicate identical or functionally similar elements.

DETAILED DESCRIPTION

Figure 1:
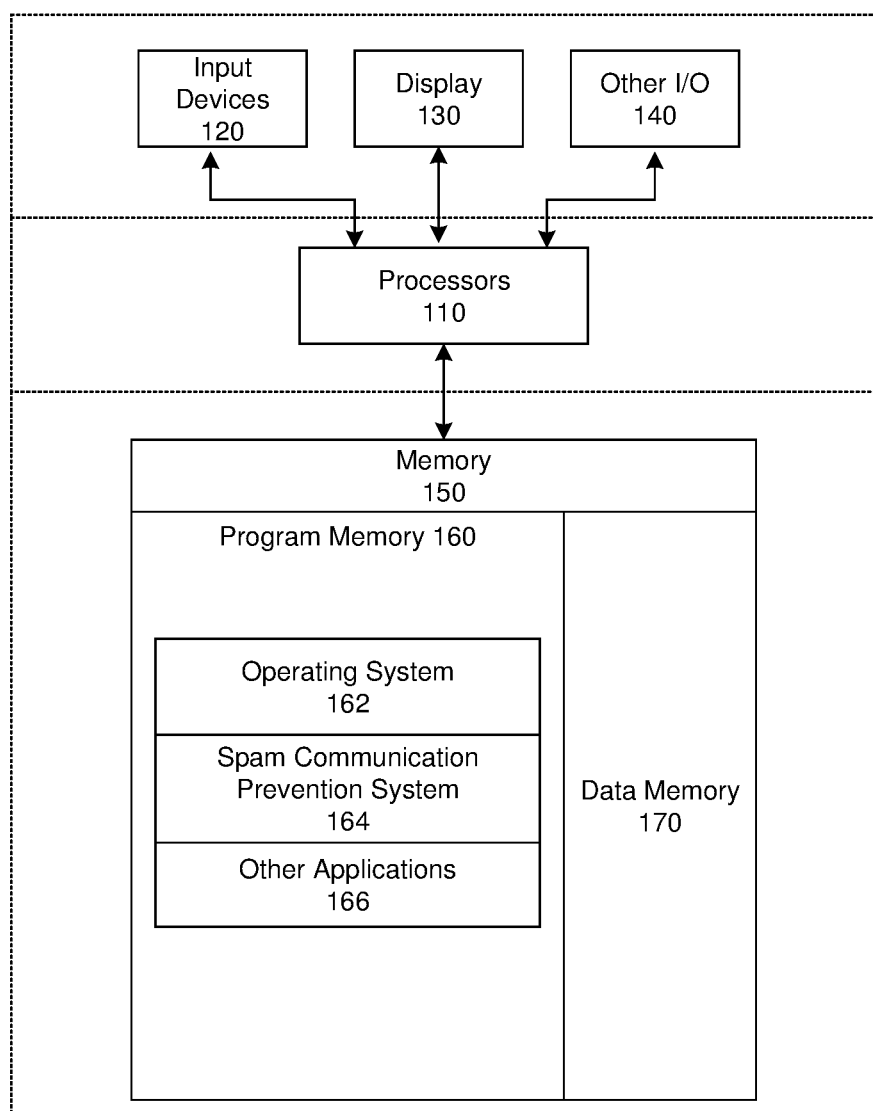
FIG. 1 is a block diagram illustrating an overview of devices on which some implementations can operate.

Aspects of the present disclosure are directed to preventing spam communications (i.e., unwanted communications by a recipient). Implementations can implement an access control list that a communicator (e.g., a user device sending a text message, making a phone call, etc.) must be on in order to complete the communication with a recipient. If they are not on the access control list, the communicator can be prevented from sending the communication to the recipient, redirected to a registration process, and/or the communication can be tagged with an unverified status flag. In some implementations, the access control list can include a recipient's contacts, contacts of the recipient's contacts, authenticated entities (e.g., authentic users and/or companies), previously verified entities, etc. In some implementations, a recipient can give out a temporary extension that a communicator can enter to complete communications with the recipient for a certain amount of time and/or for a certain number of uses.

For example, some implementations can create or access a registry of trusted phone numbers from a user's contacts, contacts of her contacts, phone numbers that were previously verified by a registration process, and/or phone numbers of companies associated with applications on her mobile phone. When a company calls the user on her mobile phone, some implementations can intercept the call and determine whether the company's phone number is on the registry of trusted phone numbers. If the company's phone number is on the registry, some implementations can connect the phone call to the user's mobile phone. If the company's phone number is not on the registry, some implementations can redirect the calling device (e.g., phone or automated dialer) to a registration process. The registration process can, for example, present an audio CAPTCHA including numbers spoken alongside other sounds, in which the entity calling the user from the company's phone number has to repeat back the numbers. If the entity is a human (e.g., can repeat the numbers back correctly), some implementations can connect the call to the user's mobile phone. If the entity is a bot or other automated dialer that cannot complete the audio CAPTCHA, some implementations can connect the call to the user's mobile phone in conjunction with a warning that the caller is not verified (e.g., through text, graphics, audio, and/or haptics). In some implementations, if the entity (e.g., a bot or other automated dialer) fails the audio CAPTCHA, some implementations can block the call to the user's mobile phone.

The technology provides specific improvements in the field of spam prevention by warning recipients of phone calls, e-mails, text messages, and/or other messages that the sender of the communication is unverified and/or by blocking the communication. By decreasing the number of unwanted communications, Internet, WiFi, and/or cellular network bandwidth can be conserved, increasing processing, connection, and/or data transfer speeds across the network. Thus, the implementations described herein are rooted in computer technology to overcome a problem specifically arising in the realm of computer networks (e.g., bandwidth consumption due to unwanted and/or unnecessary communications), as well as provide an improved user experience, cost savings, and time savings by rooting out unwanted communications.

Several implementations are discussed below in more detail in reference to the figures. FIG. 1 is a block diagram illustrating an overview of devices on which some implementations of the disclosed technology can operate. The devices can comprise hardware components of a device 100 that can prevent spam communications. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, spam communication prevention system 164, and other application programs 166. Memory 150 can also include data memory 170, e.g., registry data, authenticated entity data, contacts data, secondary contacts data, extension data, registry process data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
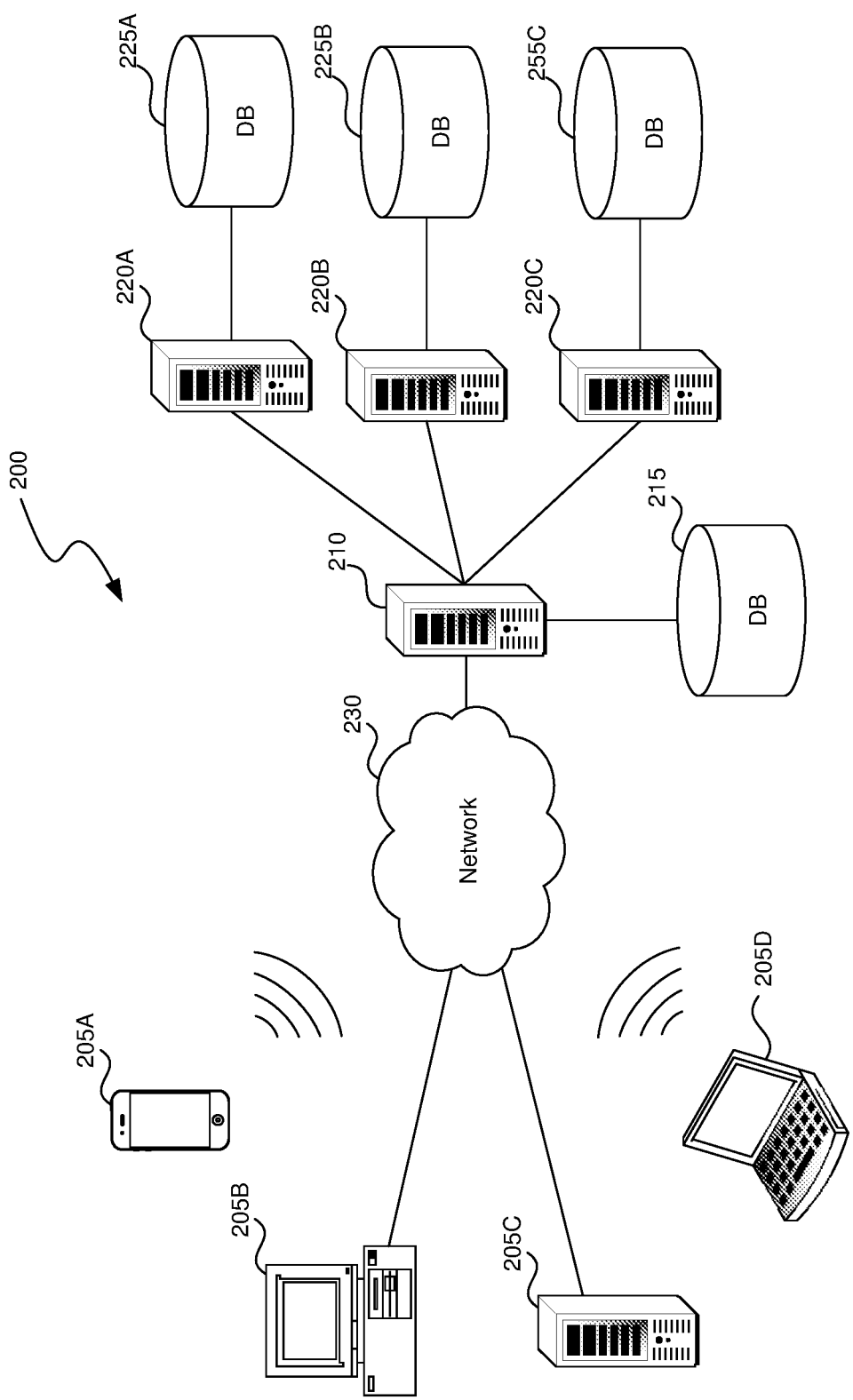
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as registry data, authenticated entity data, contacts data, secondary contacts data, extension data, registry process data, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
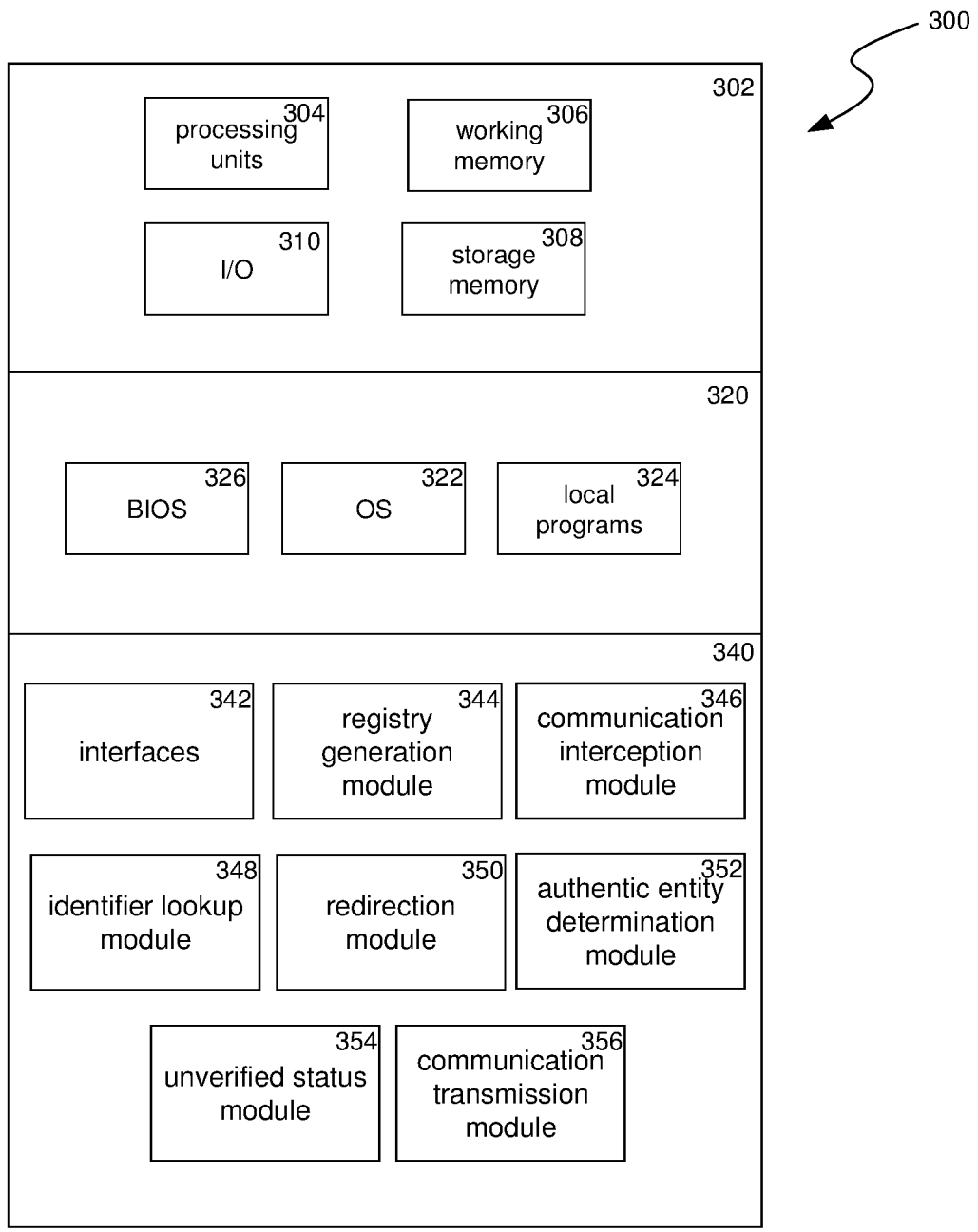
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include registry generation module 344, communication interception module 346, identifier lookup module 348, redirection module 350, authentic entity determination module 352, unverified status module 354, communication transmission module 356, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Registry generation module 344 can generate a registry of trusted devices. In some implementations, the trusted devices can be user devices (e.g., computers, mobile phones, other mobile devices, tablets, smart watches or other wearables, television devices, video game devices, etc.) and/or automated devices (e.g., automated callers, such as appointment or reservation reminder systems, etc.) that are known or likely to be known by a user of a particular receiving device of a request for communication (e.g., "authenticated entities"). The authenticated entities can be, for example, humans (e.g., users requesting communication via a trusted user device), companies (e.g., individuals or dialers representing an authenticated company requesting communication via a trusted device), and/or other organizations or groups of individuals. The registry can include identifiers of the trusted devices. The identifiers can include, for example, names of users, names of companies and/or other organizations, usernames, e-mail addresses, telephone numbers, IP addresses, MAC addresses, numbers (e.g., tokens) previously associated with a device, etc. Further details regarding generating a registry of trusted devices are described herein with respect to block 402 of FIG. 4. Further details regarding data that can be used to generate a registry of trusted devices are described herein with respect to FIG. 5. In some implementations, however, registry generation module 344 can be omitted from specialized components 340, such as when the registry of trusted devices already exists, and/or when a separate system generates the registry of devices. In such implementations, specialized components 340 can instead access the registry of devices.

Communication interception module 346 can intercept a request for communication with a receiving device from a sending device. Thus, communication interception module 346 can act as a middleman between the receiving device and the sending device. The receiving device and the sending device can be any network-enabled devices, such as computers, mobile phones, tablets, wearable, television devices, video game devices, etc., and can be the same or different types of devices. The request for communication can be, for example, a request to send an e-mail, a request to make a phone call, a request to make a WiFi call or other voice call via an application, a request to make a video call, a request to send a text message or other message (e.g., a message via an application on a computer or mobile device), a push notification from an application, etc. In various implementations, the communication interception module 346 can operate on a recipient device or on a network device between a sending device and a recipient device. Further details regarding intercepting a request for communication with a receiving device from a sending device are described herein with respect to block 404 of FIG. 4.

Identifier lookup module 348 can determine whether an identifier of the sending device is included on the registry of trusted devices generated by registry generation module 344. In some implementations, identifier lookup module 348 can extract the identifier of the sending device from the request for communication. For example, the request for communication can include a header including the identifier of the sending device, can be associated with a phone number, or have other information (e.g., an identifier of the receiving device, a date and time of the request for communication, etc.). Identifier lookup module 348 can query the registry with the identifier of the sending device to determine whether the identifier is associated with a trusted user device. If the identifier of the sending device is on the registry of trusted devices, identifier lookup module 348 can transmit a flag or other indicator of the sending device being a trusted user device to communication transmission module 356, such that communication transmission module 356 can transmit the request for communication to the receiving device. If the identifier of the sending device is omitted from the registry of trusted devices, identifier lookup module 348 can transmit a flag or other indicator of the sending device not being a trusted user device to redirection module 350. Regardless of where the communication interception module 346 is implemented, identifier lookup module 348 can operate on a recipient device or on a network device and can lookup data in a registry stored locally or on a network device. Further details regarding determining whether an identifier of a sending device is included on a registry of trusted devices are described herein with respect to block 406 of FIG. 4.

Redirection module 350 can, in response to identifier lookup module 348 determining that an identifier of the sending device is not included on the registry of trusted devices, redirect the sending device to a registration process. In some implementations, redirection module 350 can perform the redirection as a response to receiving a flag or other indicator of the sending device not being on the registry of preexisting trusted user device. In some implementations, redirection module 350 can redirect the sending device to the registration process by, for example, transmitting a prompt, webpage, hyperlink, entering an automated audio process, and/or supplying a message, in any combination of text, graphics, and/or audio to the sending device, thereby redirecting the sending device to the registration process maintained by authentic entity determination module 352. In various implementations, the redirection module 350 can operate on a recipient device or on a network device between a sending device and a recipient device. Further details regarding redirecting a sending device to a registration process are described herein with respect to block 408 of FIG. 4.

Authentic entity determination module 352 can determine, via the registration process, whether the sending device is associated with an authentic entity. The registration process can include any of one or more processes to determine whether the sending device is associated with an authentic entity (e.g., an authentic human user, either calling personally or professionally with respect to a company or organization). For example, the registration process can cause the sending device to present a CAPTCHA, textually, graphically, and/or audibly, which has to be correctly verified in order to determine that the sending device is associated with an authentic entity.

In another example, the registration process can prompt the sending device to enter an extension (e.g., a textual and/or numerical code). In some cases, the extensions can have already been entered, e.g., as part of the initial call or text being made, the email being sent, etc., in which case the authentic entity determination module 352 can retrieve the extension from metadata associated with the communication. In some implementations, one or more extensions can be created by the user of the receiving device and stored in a database, e.g., as a listing stored alongside the trusted devices in the registry maintained by registry generation module 344. In some implementations, the one or more extensions can temporarily allow sending devices entering the extension to transmit requests for communication to the receiving device without an unverified status flag or warning, and/or without the communication being blocked. In some cases, the communication having the extension causes the registration process to add the sending entity to the registry list of the recipient. If authentic entity determination module 352 determines that the sending device is associated with an authentic entity, communication transmission module 356 can transmit the request for communication to the receiving device. In various implementations, the authentic entity determination module 352 can operate on a recipient device or on a network device between a sending device and a recipient device. Further details regarding determining, via a registration process, whether a sending device is associated with an authentic entity are described herein with respect to block 410 of FIG. 4.

Unverified status module 354 can, in response to authentic entity determination module 352 determining that the sending device is not associated with an authentic entity, facilitate display of an unverified status flag (e.g., a warning) on the receiving device. Unverified status module 354 can facilitate presentation of the unverified status flag by providing commands and/or rendering data that cause the receiving device to present the unverified status flag, either prior to or in conjunction with transmission of the request for communication by communication transmission module 356. The unverified status flag can be any visual (e.g., textual and/or graphical), audible, and/or mechanical (e.g., via haptics or physical actuation of a button or other indicator) warning indicating that the sending device is not verified. For example, unverified status module 354 can facilitate presentation of the unverified status flag as an alarm, a different ringtone than that associated with a verified sending device, a warning message, a virtual stop sign, a certain vibration pattern, a different vibration pattern than that of a verified sending device, etc. In various implementations, the unverified status module 354 can operate on a recipient device or on a network device between a sending device and a recipient device. Further details regarding facilitating presentation of an unverified status flag on the receiving device are described herein with respect to block 412 of FIG. 4.

Communication transmission module 356 can transmit the request for communication to the receiving device when A) identifier lookup module 348 determines that an identifier of the sending device is on the registry of trusted devices, B) authentic entity determination module 352 determines that the sending device is associated with an authentic entity via the registration process, and/or, in some implementations, C) when authentic entity determination module 352 determines that the sending device is not associated with an authentic entity and unverified status module 354 facilitates presentation of an unverified status flag on the receiving device. However, in some implementations, if authentic entity determination module 352 determines that the sending device is not associated with an authentic entity, unverified status module 354 can facilitate display of an unverified status warning, but communication transmission module 356 can block the request for communication with the receiving device, i.e., not connect the communication between the sending device and the receiving device. In some implementations, if authentic entity determination module 352 determines that the sending device is not associated with an authentic entity, unverified status module 354 need not facilitate display of an unverified status warning, and communication transmission module 356 can block the request for communication with the receiving device from the sending device. In various implementations, the communication transmission module 356 can operate on a recipient device or on a network device between a sending device and a recipient device. Further details regarding transmitting a request for communication to a receiving device are described herein with respect to block 414 of FIG. 4.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
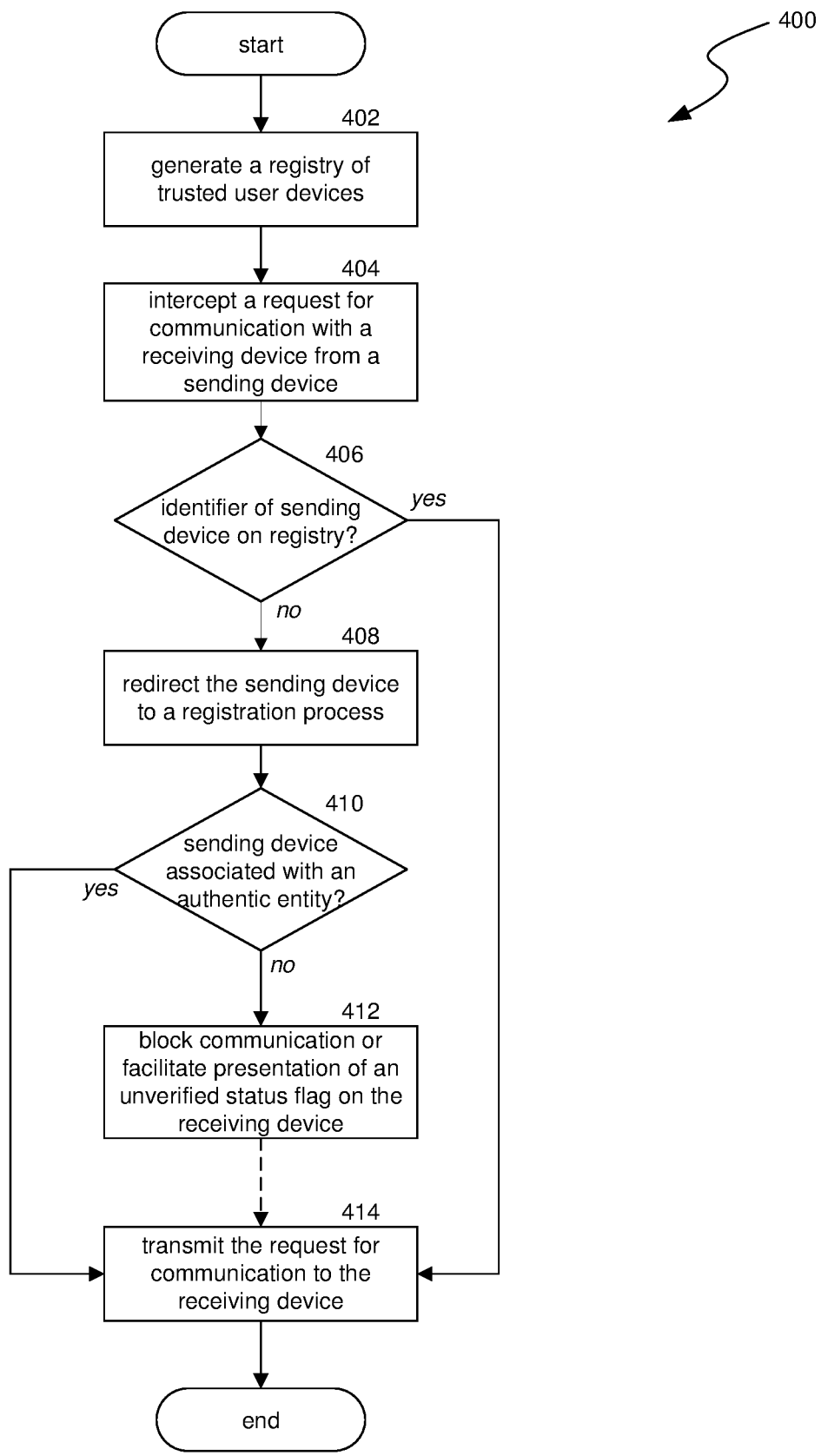
FIG. 4 is a flow diagram illustrating a process used in some implementations for preventing spam communications.

FIG. 4 is a flow diagram illustrating a process 400 used in some implementations for preventing spam communications. In some implementations, process 400 can be performed as a response to a receiving device (or an intermediary network device) receiving a request for communication with from a sending device. In some implementations, one or more blocks of process 400 can be performed by a receiving device. In some implementations, one or more blocks of process 400 can be performed by a computing system remote from a receiving device (e.g., an intermediary network device). In some implementations, process 400 can be performed by spam communication prevention system 164 of FIG. 1. In some implementations, process 400 can be performed by components 300 of FIG. 3.

At block 402, process 400 can generate a registry of trusted devices. In some implementations, the registry can be a lookup table including one or more identifiers associated with the trusted devices. For example, the registry can include a list of names, phone numbers, e-mail addresses, Internet Protocol (IP) addresses, media access control (MAC) addresses, etc., associated with trusted devices. The trusted devices can be associated with authenticated entities. The entities can be, for example, individuals, organizations, companies, etc., that are known or trusted by a user of a receiving device. The entities can be authenticated based on any of a number of factors, such as, for example, being a stored contact (e.g., in a contact list) of a user of a receiving device, being a stored contact of a contact of the user of the receiving device (i.e., a secondary contact), being associated with an application stored on the receiving device, being previously authenticated by a registration process as described further herein, being explicitly added by the user of the receiving device, being previously contacted by the user of the receiving device, etc. In some implementations, process 400 can determine one or more identifiers associated with entities having applications installed on the receiving device by, for example, querying a database of identifying information (e.g., contact information) for various entities. In some implementations, process 400 can store an indication of how the entities were authenticated in association with the identifiers, as described further herein with respect to FIG. 6. While block 402 is shown with an arrow connected to block 404, the completion of block 402 may not immediately cause block 404, but may be performed before the intercepting of the request for communication from the sending device—e.g., as an initial setup procedure. Thus, process 400 may perform block 404 upon the receipt of a request for communication.

At block 404, process 400 can intercept a request for communication with a receiving device from a sending device. In some implementations, the request can be, for example, a request for telephone communication, text message or other message communication (e.g., communication via an application, a website, etc.), e-mail communication, etc. The receiving device and the sending device can be, for example, mobile phones or other telephones, tablets, laptops or other computers, etc. In some implementations, the receiving device and the sending device can be different types of devices.

At block 406, process 400 can determine whether an identifier of the sending device is included on the registry of trusted devices. For example, process 400 can query the registry with the identifier of the sending device to determine whether the identifier is included, e.g., query the registry with a name, e-mail address, phone number, token ID, IP address, MAC address, etc. associated with the sending device. In some implementations, process 400 can determine the identifier of the sending device from the request for communication (e.g., in a "from" field of an e-mail message or text message, from a caller identification service, etc.).

If the identifier of the sending device is included on the registry, process 400 can continue to block 414. At block 414, process 400 can transmit the request for communication to the receiving device. If the identifier of the sending device is not included on the registry, at block 408, process 400 can, in response to determining that the identifier is not on the registry of trusted devices, redirect the sending device to a registration process. Process 400 can redirect the sending device by rerouting the sending device to the registration process instead of transmitting the request for communication to the receiving device, and/or by delaying transmission of the request for communication to the receiving device.

At block 410, process 400 can determine, via the registration process, whether the sending device is associated with an authentic entity. In some implementations, the registration process can include presentation of an audio CAPTCHA. For example, process 400 can send a voice message that includes numbers that must be repeated back or typed in to prevent automatic input by a bot, such as an automatic calling bot used to make spam telephone calls. If the user of the sending device is able to pass the audio CAPTCHA, process 400 can determine that the sending device is associated with an authentic entity.

In some implementations, the registration process can prompt the user of the sending device for an extension code or can retrieve an extension code already associated with the incoming communication (e.g., if the codes as inputted as part of making a call or text, as an alias email address, etc.). In some implementations, the user of the receiving device can create stored extension codes (e.g., in the registry) that are temporarily valid, e.g., are associated with a time at which the stored extension code is not longer accepted, have a limited number of users, have an assigned expiration date, have an assigned duration of validity from the first use, etc. In some cases, the extension can be valid until the user of the receiving device revokes it. In some implementations, the extension codes can be numerical, alphabetical, and/or alphanumerical. For example, when the request for communication is via telephone, the extension code can be numerical, e.g., "8888," or, to be more easily remembered, can be a word, e.g., "ANNA" (corresponding to the numbers 2662 on a telephone). In some implementations, the registration process can determine that the sending device is associated with an authentic entity by receiving an extension code corresponding to a stored extension code associated with the receiving device. Further details regarding storing extension codes are described herein with respect to FIG. 6.

If the registration process determines that the sending device is associated with an authentic entity, process 400 can continue to block 414. In some implementations, if the registration process determines that the sending device is associated with an authentic entity, process 400 can add the identifier of the sending device to the registry of trusted devices.

At block 414, process 400 can transmit the request for communication to the receiving device, e.g., by sending or allowing the e-mail, text message, telephone call, etc. to be presented on the receiving device. In some implementations, process 400 can further facilitate presentation of a verified status flag on the receiving device when the sending device is associated with an authentic entity. For example, process 400 can provide commands and/or data needed to cause the receiving device to present the verified status flag, e.g., via one or more of graphics, text, audio, haptics, etc., in order to indicate to the user of the receiving device that the sending device has been verified.

If the registration process determines that the sending device is not associated with an authentic entity, process 400 can proceed to block 412. At block 412, process 400 can block the communication or facilitate presentation of an unverified status flag on the receiving device. Process 400 can facilitate presentation of the unverified status flag by, for example, providing commands and/or data to the receiving device that can cause the receiving device to present the unverified status flag. The unverified status flag can be presented in any suitable form. For example, the receiving device can present the unverified status flag via one or more of graphics, text, audio, haptics, etc., in order to indicate to the user of the receiving device that the sending device has not been verified. If process 400 blocks the communication, process 400 can end following block 412—but may also cause a log of the blocked call to be recorded and/or a notification or to be provided on the receiving device. If process 400 uses the unverified status flag, process 400 can proceed from block 412 to block 414, as indicated by the dashed line between block 412 and 414. At block 414, process 400 can transmit the request for communication to the receiving device, e.g., by sending the e-mail, sending the text message, transmitting the telephone call, etc.

Although illustrated as being performed once, it is contemplated that multiple instances of process 400 can be performed consecutively and/or in parallel as requests for telephone communication are received. For example, it is contemplated that process 400 can intercept a first request for communication with a receiving device from a first sending device. Process 400 can determine whether an identifier of the first sending device is included on the registry of trusted devices. If the identifier of the first sending device is on the registry, process 400 can transmit the request for communication to the receiving device. However, in response to determining that the identifier of the first sending device is not included on the registry of trusted devices, process 400 can redirect the first sending device a registration process, as described further herein. Process 400 can further determine, via the registration process, whether the first sending device is associated with an authentic entity (i.e., a "first authentic entity"). In response to determining that the first sending device is associated with an authentic entity, process 400 can transmit the first request for communication to the receiving device.

Process 400 can further intercept a second request for communication with the receiving device from a second sending device. Process 400 can determine whether an identifier of the second sending device is included on the registry of trusted devices. If the identifier of the second sending device is on the registry, process 400 can transmit the request for communication to the receiving device. However, in response to determining that the identifier of the second sending device is not included on the registry of trusted devices, process 400 can redirect the second sending device the registration process. Process 400 can further determine, via the registration process, whether the second sending device is associated with an authentic entity (i.e., a "second authentic entity"). In response to determining that the second sending device is not associated with an authentic entity, process 400 can either: facilitate display of an unverified status flag on the receiving device and transmit the request for communication to the second receiving device; or block the second request for communication with the receiving device. In some implementations, the first request for communication and/or the second request for communication can be requests for telephone communication, e.g., a request for a phone call, video call, and/or a request to send a text or multimedia message via a mobile device. In some implementations, the first request for communication and/or the second request for communication can be requests for textual communication, e.g., a text message or other message and/or an e-mail message. In some implementations, the first request for communication and the second request for communication can be requests to send different types of communication.

Figure 5:
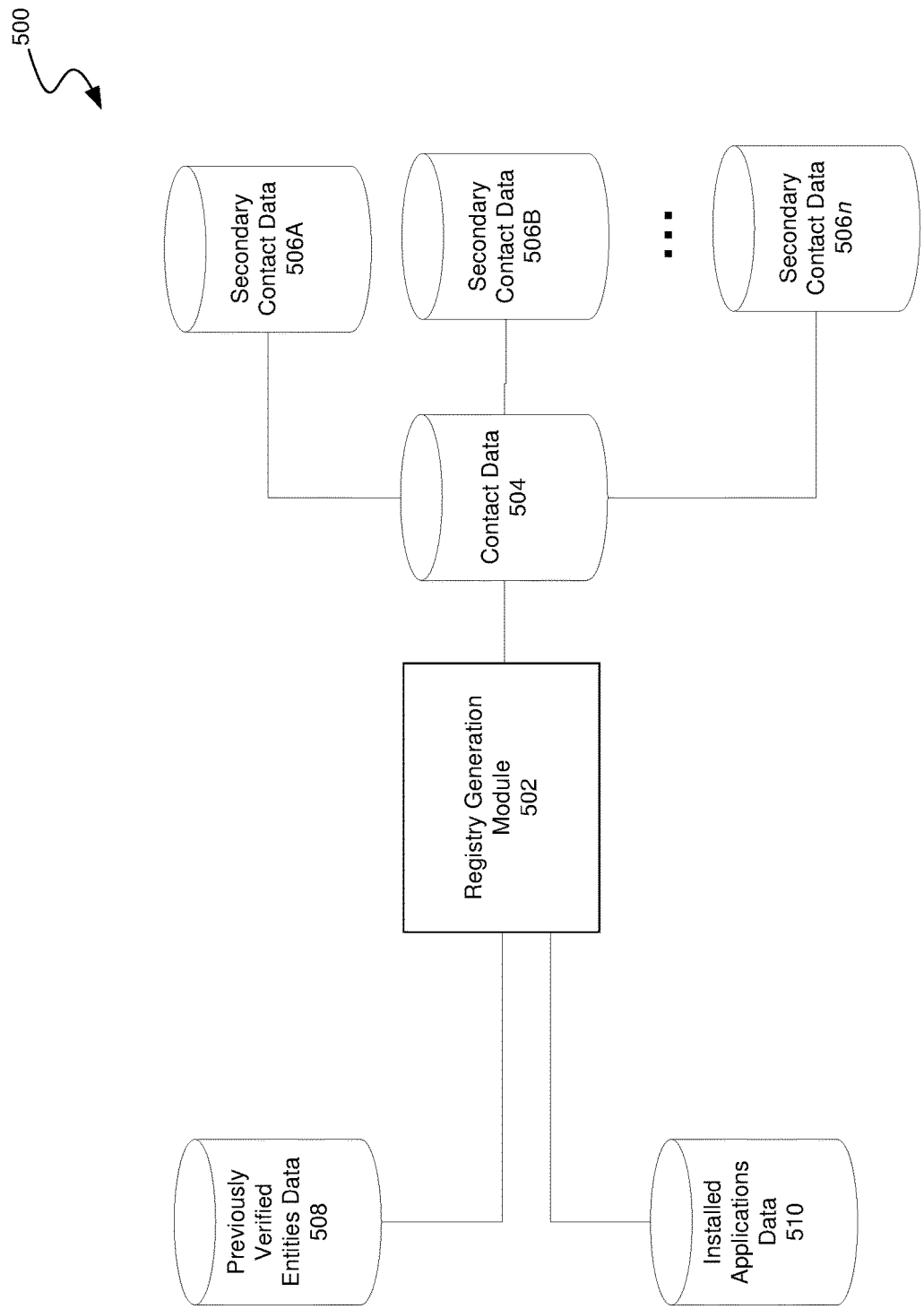
FIG. 5 is a block diagram illustrating a system including data inputs to a registry generation module according to some implementations.

FIG. 5 is a block diagram illustrating a system 500 including data inputs to a registry generation module 502 according to some implementations. In some implementations, registry generation module 502 can be similar to registry generation module 344 of FIG. 3. Registry generation module 502 can generate a registry of trusted devices associated with authenticated entities. In order to generate the registry, registry generation module 502 can receive various data as inputs. For example, registry generation module 502 can receive contact data 504 associated with contacts of a receiving device, secondary contact data 506A-506n associated with contacts of contacts within contact data 504, previously verified entities data 508, and installed applications data 510. In some implementations, if secondary contact data 506A-506n includes a contact of multiple contacts within contact data 504 (e.g., more than a threshold number of contacts have an entity as their contact), some implementations can push a link to the secondary contact, automatically register the secondary contact, and/or give an option to a user of a receiving device to add the secondary contact to previously verified entities data 508 as a trusted entity.

Contact data 504 can include identifiers of trusted devices saved by the receiving device (e.g., user devices known to be authentic by a user of the receiving device), such as names of users associated with the trusted devices, e-mail addresses associated with the trusted devices, phone numbers associated with the trusted devices, etc. Once contact data 504 is known, registry generation module 502 can receive secondary contact data 506A-506n. Secondary contact data 506A-506n can include identifiers of contacts of contacts (i.e., secondary contacts) found in contact data 504. For example, if contact data 504 includes contact information for Mark, Jen, and Paul, and Mark's contact data (e.g., secondary contact data 506A) includes Will, Dan, and Sara, then identifiers associated with Will, Dan, and Sara can be provided to registry generation module 502.

Previously verified entities data 508 can include identifiers of entities and/or devices that were previously verified, e.g., through a registration process as described further herein with respect to block 410 of FIG. 4. Installed application data 510 can include identifiers of entities having applications installed on the receiving device. For example, if the receiving device has an application issued by ABC Bank, installed applications data 510 can include identifiers (e.g., company name, phone numbers, e-mail addresses, etc.) associated with ABC Bank. Registry generation module 502 can access contact data 504 associated with contacts of a receiving device, secondary contact data 506A-506n associated with contacts of contacts within contact data 504, previously verified entities data 508, and installed applications data 510 to build a registry of trusted devices, as described further herein with respect to block 402 of FIG. 4. In some cases, entities can register their contacts with a separate registration system to be included in multiple user's registries. For example, a trusted corporation could register all their phone numbers, email addresses, email domain, etc. with such a registry service to have their communications be exempt from being blocked. In some cases, the registry can have an association between the entity and the registered identifiers, and those identifiers when used to communicate with a recipient cannot be blocked when there is a second association between the recipient and the entity, such as having that entity's app installed on their mobile device, having a registered account with the entity, having set the entity as an allowed communication sender, etc.

FIG. 6 is a conceptual diagram illustrating an example registry 600 according to some implementations. In some implementations, registry 600 can include trusted devices 602 and extensions 604. In some implementations, registry 600 can omit extensions 604, and extensions 604 can be stored and/or managed separately from trusted devices 602. Trusted devices 602 can include identifiers of trusted devices (e.g., e-mail addresses and/or phone numbers). In some implementations, the identifiers of the trusted devices can be stored in conjunction with the names of users associated with those trusted devices. Some implementations can query registry with the identifier and/or name of the user in order to determine whether a user device is trusted. In some implementations, trusted devices 602 can further include the type of trusted user device, i.e., the reason why the user device is trusted. For example, trusted devices 602 can include metadata indicating whether an entity (e.g., company, organization, individual, etc.) and/or user device is a contact of the receiving device; whether an entity and/or user device is a contact of a contact of the receiving device (i.e., a secondary contact); whether the entity and/or user device were previously verified by a registration process, as described further herein; and/or whether the identifier is associated with an entity having an application installed on the receiving device.

In some implementations, registry 600 can further include extensions 604. Extensions 604 can include a list of alphabetical, numerical, and/or alphanumerical codes that can be used by a user device during a registration process in order to be validated by being associated with an authentic entity (e.g., a trusted user, company, organization, a human, etc.). Extensions 604 can further include a count of how many times the extension was used and when the extension is valid until (e.g., as indicated by a certain number of uses and/or an expiration date for the extension). In some implementations, extensions 604 can further include a status of the extension (e.g., valid or expired) based on the number of uses, the number of allowed uses, and/or the expiration date with respect to today's date. In some implementations, a user of a receiving device can manage registry 600. For example, a user can manually add, edit, or remove entries from registry 600, and/or update or provide expiration dates or specify extensions 604 for entries on registry 600.

Figure 7A:
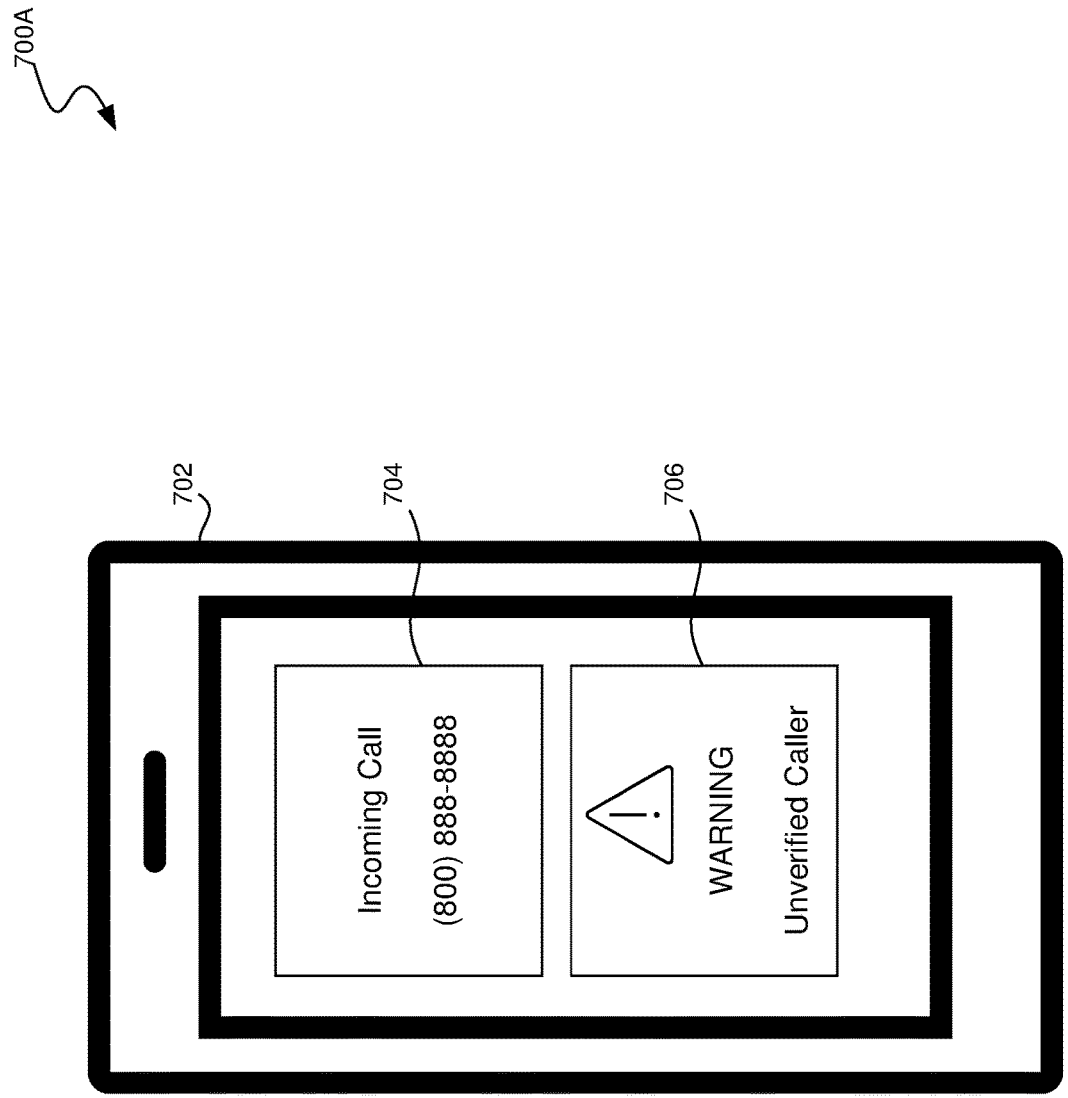
FIG. 7A is a conceptual diagram illustrating an example unverified status warning on a mobile device for a telephone call according to some implementations.

FIG. 7A is a conceptual diagram illustrating an example 700A unverified status warning 706 on a mobile device 702 for a telephone call according to some implementations. For example, spam communication prevention system 164 of FIG. 1 and/or process 400 of FIG. 4 can facilitate rendering of unverified status warning 706 based on a determination through a registration process that a sending device is not associated with an authentic entity. In example 700A, mobile device 702 can display an identifier 704 of a sending device requesting telephone communication along with unverified status warning 706, such that a user of mobile device 702 can view identifier 704 and determine whether identifier 704 is likely associated with an entity issuing a spam communication (e.g., an 800, 855, 866, 888 area code, etc.). Although illustrated as being graphical and textual, it is contemplated that unverified status warning 706 can be only graphical or only textual, and can additionally or alternatively include an audio warning (e.g., an alarm or verbal announcement), a haptics warning (e.g., a certain vibration pattern, a vibration pattern different than the vibration typically made when a phone call is received on the receiving device), etc.

Figure 7B:
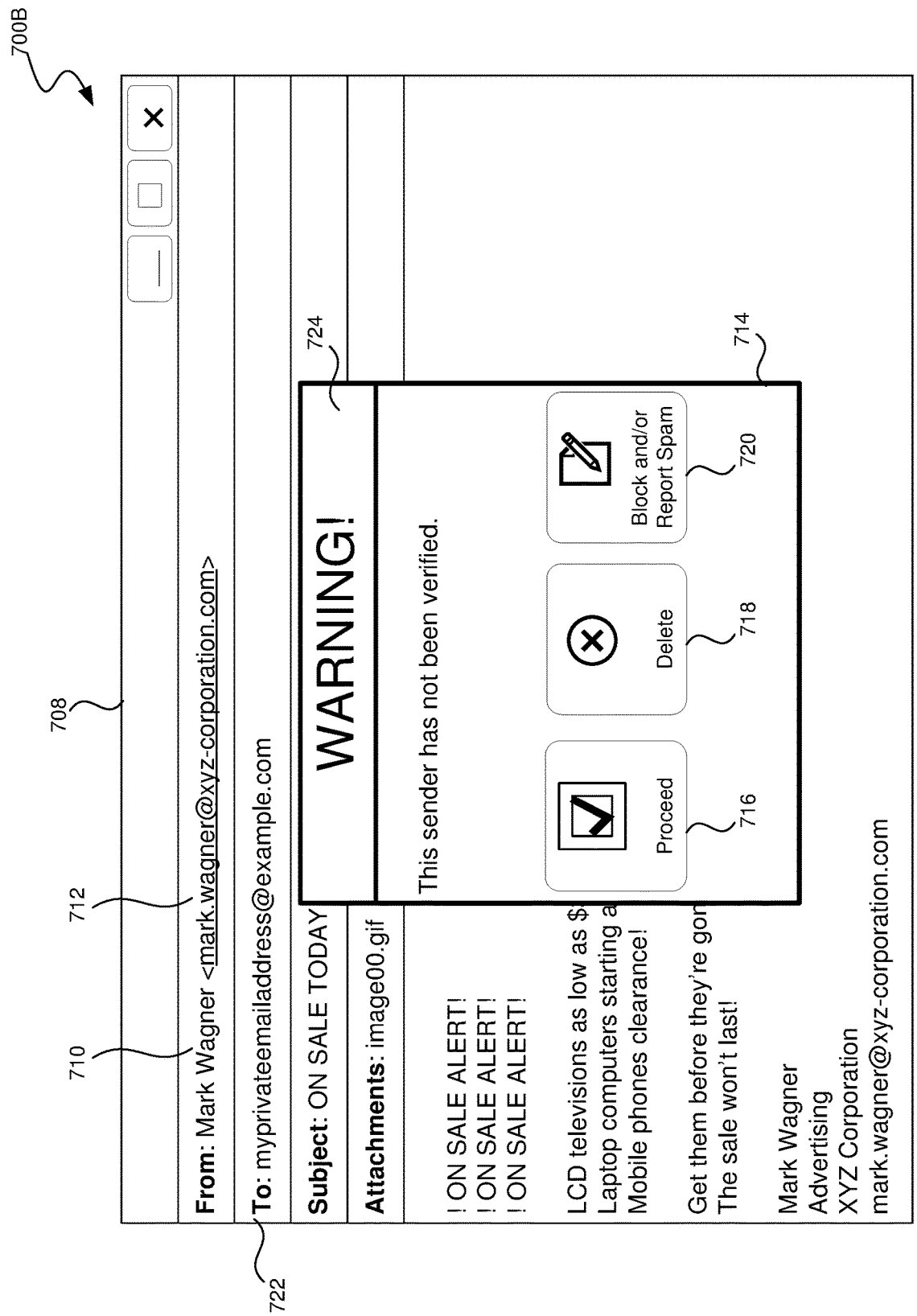
FIG. 7B is a conceptual diagram illustrating an example unverified status warning for an e-mail according to some implementations.

FIG. 7B is a conceptual diagram illustrating an example 700B unverified status warning 714 for an e-mail 708 according to some implementations. For example, spam communication prevention system 164 of FIG. 1 and/or process 400 of FIG. 4 can facilitate rendering of unverified status warning 714 based on a determination through a registration process that a sending device is not associated with an authentic entity. E-mail 708 can include identifiers 710, 712 associated with the sending device sending e-mail 708. Identifier 710 can be a name of the entity sending e-mail 708, and identifier 712 can be an e-mail address of the entity sending e-mail 708. E-mail 708 can further include identifier 722 associated with a receiving device.

Some implementations can generate a registry (e.g., registry 600 of FIG. 6) for identifier 722 associated with the receiving device, e.g., including contacts stored in association with identifier 722, contacts of contacts stored in association with identifier 722 (i.e., secondary contacts), identifiers associated with previously verified entities and/or user devices, and/or identifiers associated with applications installed by the receiving device associated with identifier 722. If identifier 710 and/or identifier 712 are not on the registry, some implementations can redirect the sending device associated with identifiers 710, 712 to a registration process in order to determine that identifiers 710, 712 are not associated with an authentic entity. For example, some implementations can facilitate presentation of a CAPTCHA to determine that identifiers 710, 712 are associated with a bot or other automated e-mail system. In another example, some implementations can prompt the sending device associated with identifiers 710, 712 to enter an extension, and can determine that the sending device is not associated with an authentic entity based on an incorrect, invalid, or omitted extension.

In response to the determination that the sending device associated with identifiers 710, 712 is not associated with an authentic entity, some implementations can display unverified status warning 714 on the receiving device associated with identifier 722. Unverified status warning 714 can include a warning 724; in this case, a textual warning. However, it is contemplated that warning 724 can alternatively or additionally include a graphical warning, an audio warning, and/or a haptics warning. In some implementations, unverified status warning 714 can further include options 716-720 with respect to e-mail 708. For example, unverified status warning 714 can include option 716 to proceed to view the e-mail, option 718 to delete the e-mail, and option 720 to block the e-mail and/or report the e-mail as spam. In some implementations, unverified status warning 714 can further include an option to hold the e-mail (not shown) while requesting that the sending device become a verified or trusted device, then allow the send item through once verification is complete. However, in some implementations, it is contemplated that unverified status warning 714 does not need to include any options 716-720, and can merely warn the user associated with identifier 722 of e-mail 708's unverified status.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for preventing spam communications, the method comprising:
   generating a registry of trusted devices, the trusted devices being associated with authenticated entities;
   intercepting a first request for telephone communication with a receiving device from a first sending device;
   determining that an identifier of the first sending device is not included on the registry of trusted devices;
   in response to determining that the identifier of the first sending device is not included on the registry of trusted devices, redirecting the first sending device to a registration process which includes:
      interrogating an installed application dataset, specifying identifiers of applications installed on the receiving device, to determine that an application provided by an entity, associated with the identifier of the first sending device, is installed on the receiving device; and
      in response to the determining that the application provided by the entity is installed on the receiving device, determining that the first sending device is associated with a first authentic entity;
   in response to determining that the first sending device is associated with the first authentic entity, transmitting the first request for telephone communication to the receiving device;
   intercepting a second request for telephone communication with the receiving device from a second sending device;
   determining that an identifier of the second sending device is not included on the registry of trusted devices;
   in response to determining that the identifier of the second sending device is not included on the registry of trusted devices, redirecting the second sending device to the registration process;
   determining, via the registration process, that the second sending device is not associated with a second authentic entity; and
   in response to determining that the second sending device is not associated with the second authentic entity:
      facilitating presentation of an unverified status flag on the receiving device and transmitting the second request for telephone communication to the receiving device; or
      blocking the second request for telephone communication with the receiving device.

2. The method of claim 1, wherein the registry of trusted devices includes one or more identifiers associated with one or more contacts of the receiving device.

3. The method of claim 2, wherein the registry of trusted devices includes one or more identifiers associated with one or more secondary contacts, the one or more secondary contacts being one or more contacts of the one or more contacts of the receiving device.

4. The method of claim 1, wherein the registry of trusted devices includes one or more identifiers associated with one or more devices that previously completed the registration process.

5. The method of claim 1, wherein further in response to determining that the first sending device is associated with the first authentic entity, the method further comprises:
   adding the identifier of the first sending device to the registry of trusted devices.

6. The method of claim 1, wherein the registration process further includes providing and verifying an audio CAPTCHA.

7. The method of claim 1, wherein the registration process further includes receiving an extension code corresponding to a stored extension code associated with the receiving device.

8. The method of claim 7, wherein the stored extension code is associated with a time at which the stored extension code will no longer be accepted.

9. A computer-readable storage medium storing instructions that, when executed by a computing system, cause the computing system to perform a process for preventing spam communications, the process comprising:
   intercepting a first request for communication with a receiving device from a first sending device;
   determining that an identifier of the first sending device is not included on a registry of trusted devices;
   in response to determining that the identifier of the first sending device is not included on the registry of trusted devices, redirecting the first sending device to a registration process which includes:
      interrogating an installed application dataset, specifying identifiers of applications installed on the receiving device, to determine that an application provided by an entity, associated with the identifier of the first sending device, is installed on the receiving device; and
      in response to the determining that the application provided by the entity is installed on the receiving device, determining that the first sending device is associated with a first authentic entity;

in response to determining that the first sending device is associated with the first authentic entity, transmitting the first request for communication to the receiving device;
intercepting a second request for communication with the receiving device from a second sending device;
determining that an identifier of the second sending device is not included on the registry of trusted devices;
in response to determining that the identifier of the second sending device is not included on the registry of trusted devices, redirecting the second sending device to the registration process;
determining, via the registration process, that the second sending device is not associated with a second authentic entity; and
in response to determining that the second sending device is not associated with the second authentic entity:
facilitating presentation of an unverified status flag on the receiving device and transmitting the second request for communication to the receiving device; or
blocking the second request for communication with the receiving device.

10. The computer-readable storage medium of claim 9, wherein the first request for communication is a first request for telephone communication, and
wherein the second request for communication is a second request for telephone communication.

11. The computer-readable storage medium of claim 9, wherein the process further comprises:
generating the registry of trusted devices, the trusted devices being associated with authenticated entities.

12. The computer-readable storage medium of claim 9, wherein the registry of trusted devices includes one or more identifiers associated with one or more contacts of the receiving device.

13. The computer-readable storage medium of claim 12, wherein the registry of trusted devices includes one or more identifiers associated with one or more secondary contacts, the one or more secondary contacts being one or more contacts of the one or more contacts of the receiving device.

14. The computer-readable storage medium of claim 9, wherein the registry of trusted devices includes one or more identifiers associated with one or more devices that previously completed the registration process.

15. The computer-readable storage medium of claim 9, wherein further in response to determining that the first sending device is associated with the first authentic entity, the process further comprises:

adding the identifier of the first sending device to the registry of trusted devices.

16. The computer-readable storage medium of claim 9, wherein the registration process further includes providing a verifying a CAPTCHA.

17. The computer-readable storage medium of claim 9, wherein the registration process further includes receiving an extension code corresponding to a stored extension code associated with the receiving device.

18. The computer-readable storage medium of claim 16, wherein the stored extension code is associated with a time at which the stored extension code will no longer be accepted.

19. A computing system for preventing spam communications, the computing system comprising:
one or more processors; and
one or more memories storing instructions that, when executed by the one or more processors, cause the computing system to perform a process comprising:
intercepting a request for communication with a receiving device from a sending device;
determining that an identifier of the sending device is not included on a registry of trusted devices;
in response to determining that the identifier of the sending device is not included on the registry of trusted devices, redirecting the sending device to a registration process which includes:
interrogating an installed application dataset, specifying identifiers of applications installed on the receiving device, to determine that an application provided by an entity, associated with the identifier of the sending device, is not installed on the receiving device; and
in response to determining that the application provided by the entity is not installed on the receiving device, determining that the sending device is not associated with an authentic entity; and
in response to determining that the sending device is not associated with the authentic entity:
facilitating presentation of an unverified status flag on the receiving device and transmitting the request for communication to the receiving device; or
blocking the request for communication with the receiving device.

20. The computing system of claim 19, wherein the request for communication is a request for telephone communication.

* * * * *